May 17, 1966     G. DUMBAUGH     3,251,457
METHOD AND APPARATUS FOR DRIVING VIBRATORY DEVICES
Filed Oct. 5, 1965     5 Sheets-Sheet 3
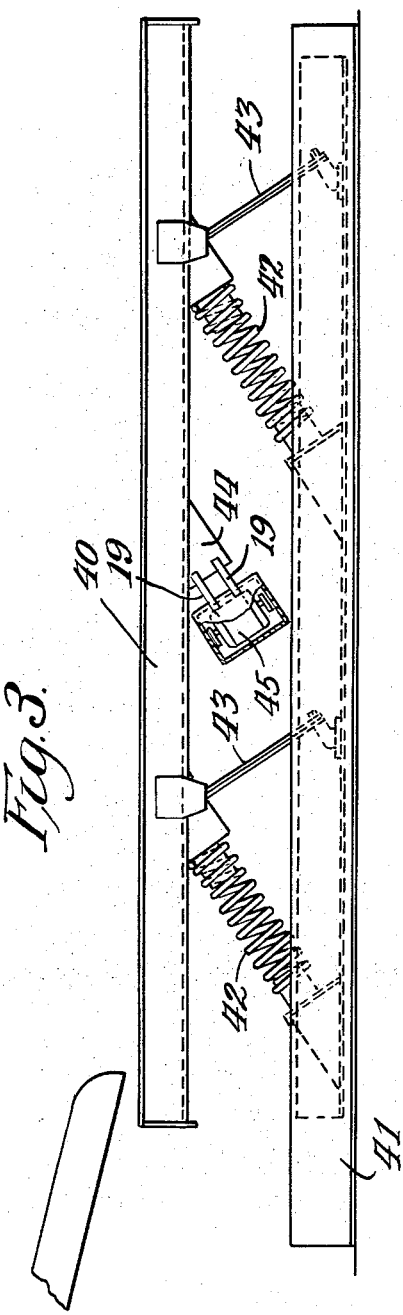
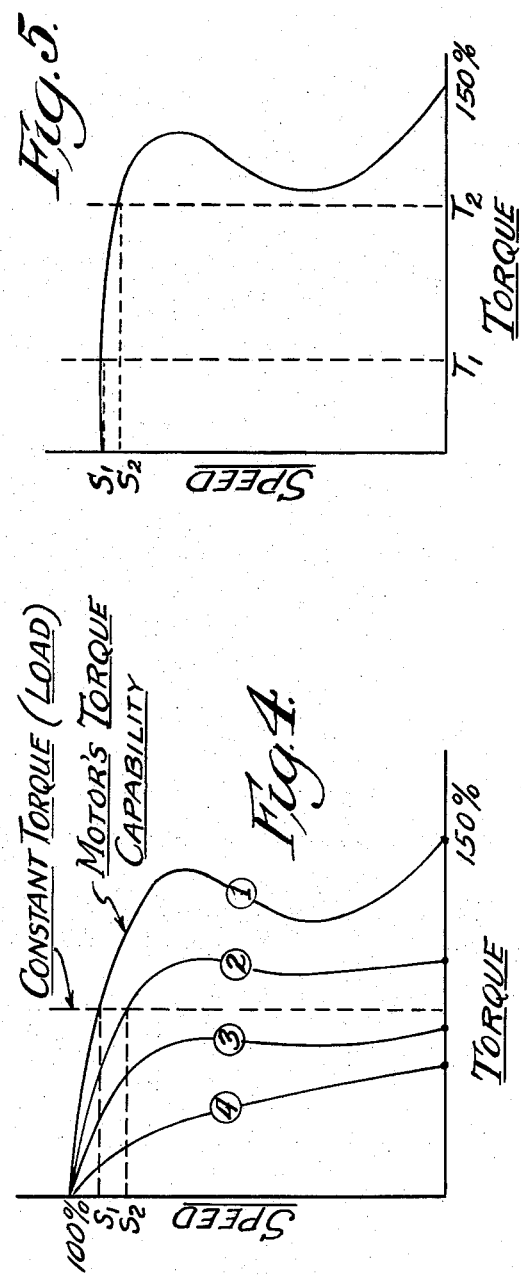
Inventor
George Dumbaugh
By Mann, Brown & McWilliams
Attys.

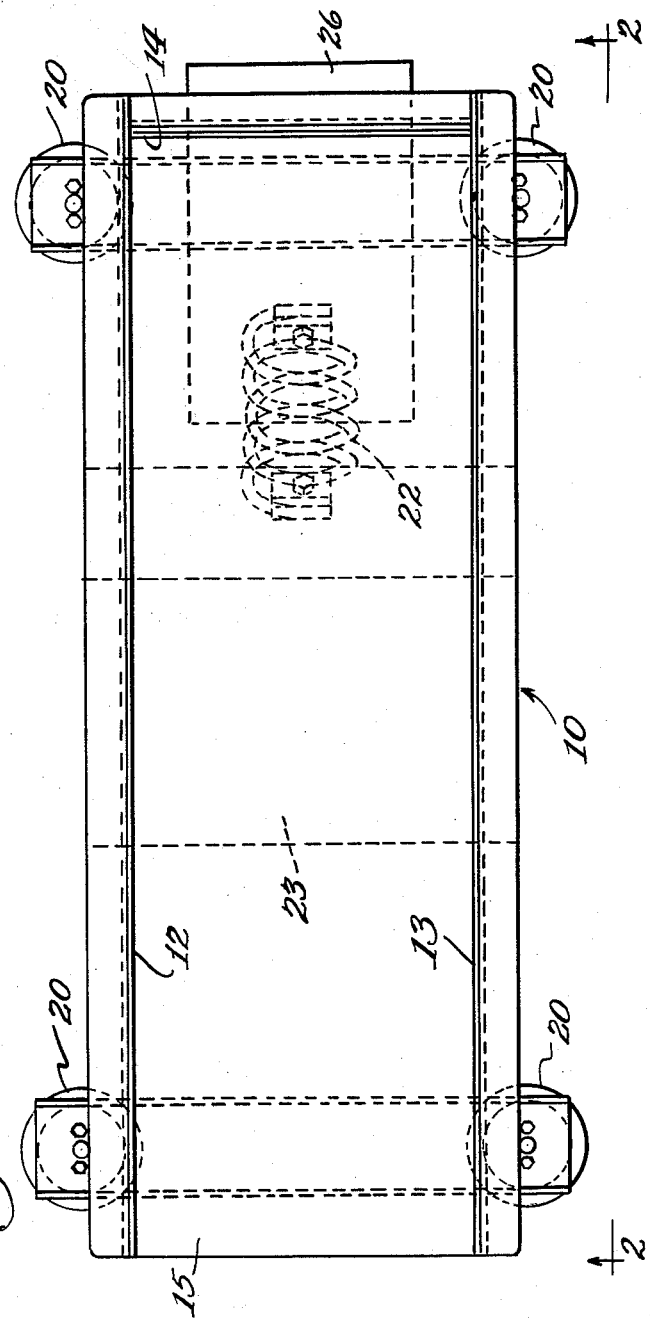

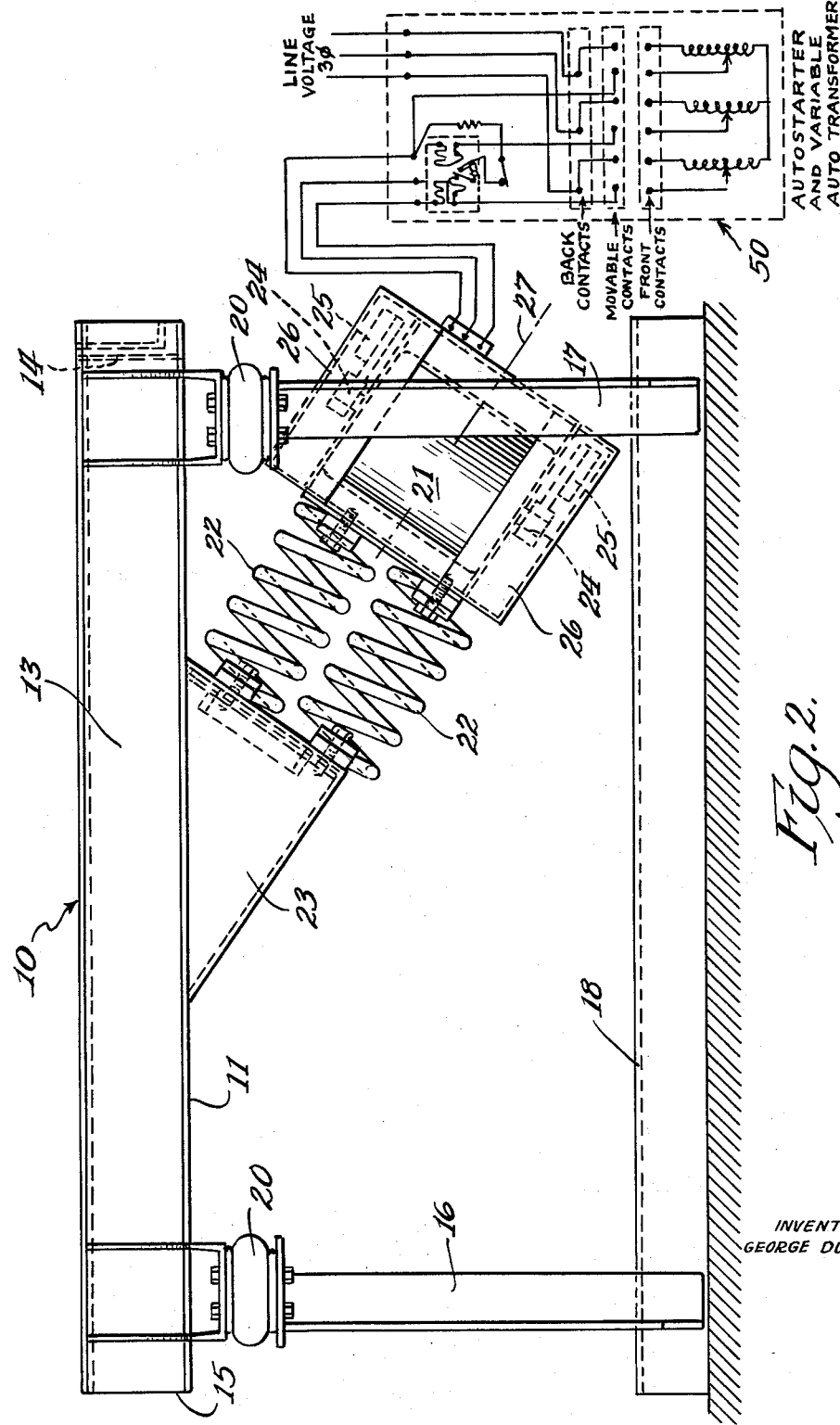

May 17, 1966 G. DUMBAUGH 3,251,457
METHOD AND APPARATUS FOR DRIVING VIBRATORY DEVICES
Filed Oct. 5, 1965 5 Sheets-Sheet 4
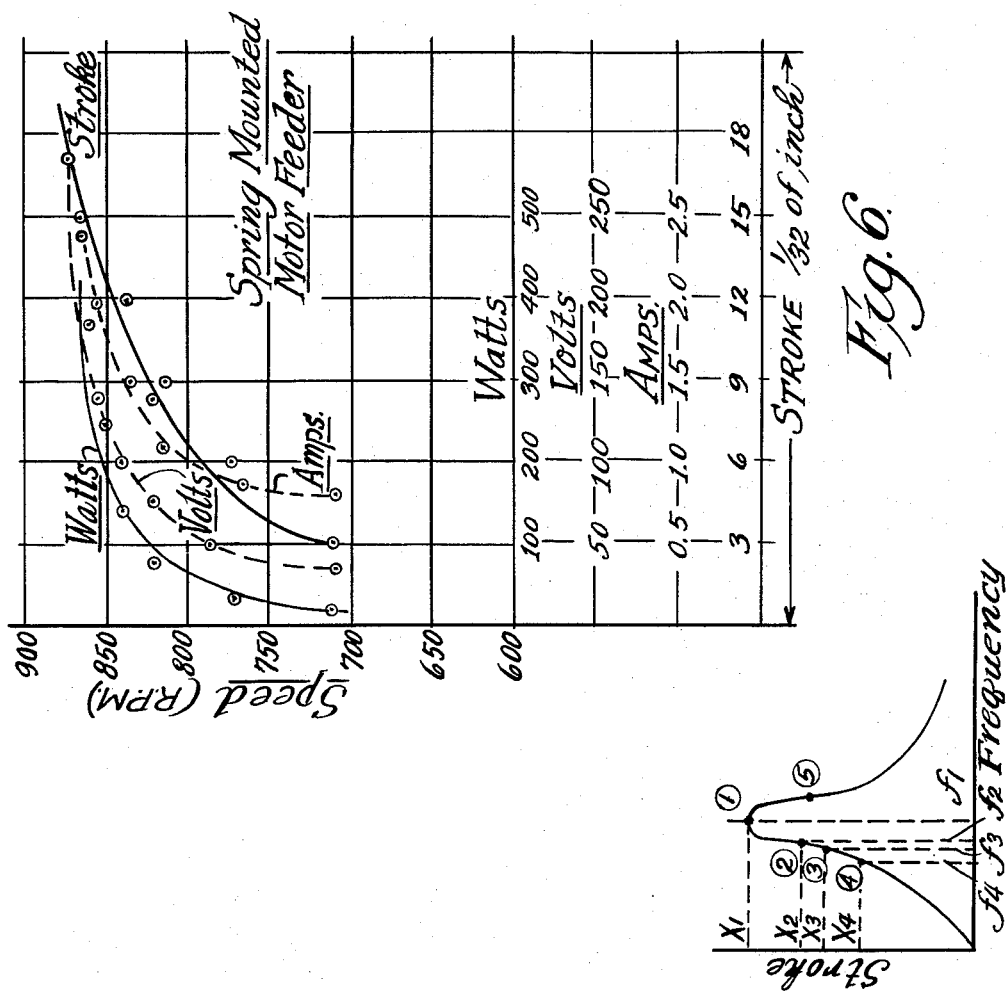
Inventor
George Dumbaugh
By Mann, Brown & McWilliams
Attys.

May 17, 1966 G. DUMBAUGH 3,251,457
METHOD AND APPARATUS FOR DRIVING VIBRATORY DEVICES
Filed Oct. 5, 1965 5 Sheets-Sheet 5
*Fig. 8a*        *Fig. 8b.*
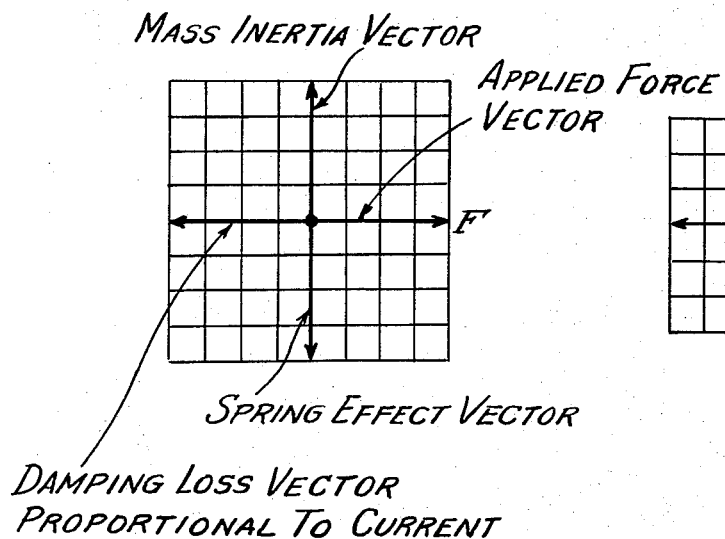
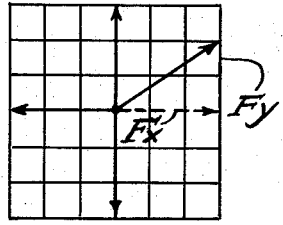
*Fig. 8c.*
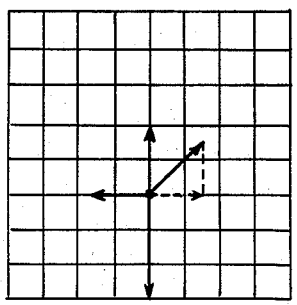
Inventor
George Dumbaugh
By Mann, Brown & McWilliams
Attys.

United States Patent Office 3,251,457
Patented May 17, 1966

3,251,457
METHOD AND APPARATUS FOR DRIVING VIBRATORY DEVICES
George Dumbaugh, Louisville, Ky., assignor to Carrier Manufacturing Co., a corporation of Kentucky
Filed Oct. 5, 1965, Ser. No. 493,197
12 Claims. (Cl. 198—220)

There are many types of vibratory drive devices in which it is desirable to vary the frequency and/or the stroke of the drive. Vibrating screens, vibrating feeders, vibrating conveyors and vibrating separators are typical of this type of device. The need for adjusting the frequency and/or stroke may be related to the type of material being handled by the device, or may be related to the volume of such material, or the rate at which the material is to be processed or dealt with by the equipment.

This invention relates to a novel drive for equipment of this type and is characterized by the fact that both frequency and stroke are varied simultaneously.

The invention can be most readily explained as applied to a vibratory feeder, although it will be understood that the use of this type of device for explaining the invention is merely illustrative.

In the handling of particulate bulk material, there are numerous ways for conveying such material and feeding it over an open end of the conveyor to a desired point of delivery. This invention is concerned only with that type in which the conveyor or feeder trough is vibrated as a free mass, i.e., the trough or conveyor is suitably isolated from the ground so that it may be vibrated in response to an oscillating force, as distinguished from a mass which is positively connected to the exciting force, as, for example, by driving the conveyor through an arm rigidly connected to a fixed stroke eccentric drive.

In practice today, it is customary to use mechanical means for varying the frequency or the stroke of the feeder. An exception to mechanical means for adjusting rates of feed is in the case of an electromagnetic drive for a feeder, in which case the frequency or the voltage of the applied pulsating current applied to the electromagnetic drive is varied. However, in this type of device the vibrations per minute used are generally above 1800 cycles per minute and have relatively short strokes with the result that such feeders are limited to bulk materials of the more free-flowing type as distinguished from those which are characterized as damp or viscous.

When mechanical means are used for varying frequency or stroke, it has been common to use either a variable rate spring device which may include an air bag interposed in the drive with the pressure in the air bag being adjustable to effect the change of spring rate, or some form of mechanical adjustment of the drive motor's angularity or position relative to the pan.

There have been many attempts, in vibratory feeders, to utilize some form of adjustable feed rate control using electrical phenomena, but to date none of these have been successful for a number of reasons. The electromagnetic type vibrators have high energy losses and are restricted to essentially high frequency and short stroke combinations. Low frequency, long stroke devices have been conceived that utilize adjustable frequency A.C. drives, multi-speed, and/or multi-winding A.C. motors, or adjustable voltage D.C. drives. None of these drives have met with success because of high initial cost, and the cost of maintenance due to brush wear, commutator problems and the like.

It is a principal object of the present invention to provide an extremely simple and practical way to adjust frequency and stroke, in the drive for vibrating devices, and to accomplish this result through the use of electrical phenomena combined with mechanical impedances which are purposely built into the vibrating mass system.

A further objective of the invention is to provide an electric drive for vibratory equipment which lends itself to simplified remote control for changing the frequency and the stroke of the vibratory equipment.

A still further object of the invention is to make use of an A.C. squirrel cage induction motor which is well known to have rugged performance characteristics, low maintenance costs and low initial costs as compared to other electrical motors which are capable of adjustable speeds.

Further and other objects and advantages will become apparent as the disclosure proceeds and the description is read in the light of the accompanying drawings in which:

FIGURE 1 is a plan view showing the drive of this invention applied to a natural frequency vibratory feeder where the springs are in series with the motor drive;

FIGURE 2 is a side elevational view of the same;

FIGURE 3 is a side elevational view illustrating the manner in which the invention may be applied to a different form of natural frequency vibratory feeder in which the exciter is suspended from the vibratory mass system and acts in parallel with the springs which are selected to give the system natural frequency characteristics;

FIGURES 4 through 7 are graphs which will be used in explaining certain aspects of the invention; and FIGURES 8a, 8b and 8c are vector diagrams that are useful in understanding the invention.

It should be understood that the invention may be widely applied within the teachings hereof and the specific description which follows is merely illustrative of the manner in which the invention may be used advantageously.

In the vibratory feeder shown in FIGURES 1 and 2, it will be seen that the feeder comprises a trough 10 defined by a bottom wall 11, side walls 12, 13, and an end wall 14, with the forward end of the trough being open as indicated at 15. It is over this end of the trough that bulk particulate material such as sand, gravel and the like is delivered to a desired point at some selected rate of speed. This bulk material is usually placed on the pan from an overhead discharge bin, an overhead conveyor, or some similar means.

The vibratory trough or feeder pan 10 is mounted on stanchions 16 and 17 which are carried at the front and rear portions of a bed 18 which may be suspended from overhead or bolted to the floor. Interposed between the stanchions 16, 17 and the trough 10 are isolators 20 which may be any suitable type of spring suspension, but in this case they are shown as air springs. These isolators merely permit the vibratory trough 10, with the load which it carries to vibrate as a free mass, as distinguished from a vibratory mass driven in oscillatory fashion by a fixed stroke eccentric drive which is connected positively to the vibrating pan.

Mounted beneath the trough 10 is a motor drive for vibrating the pan at a selected frequency and stroke for moving particulate material on the pan toward the feeding end 15 of the trough. The drive in the present invention is capable of adjusting the rate of feed by varying the frequency and the stroke of the vibratory system.

The motor drive in FIGURES 1 and 2 comprises a single alternating current squirrel cage induction motor 21 which is supported by two helical springs 22 from a motor mount bracket 23 rigidly secured to the bottom of the pan 10. The motor has a squirrel cage rotor, and is thereby characterized as one which does not have brushes. For convenience the type of A.C. motor will hereinafter be referred to simply, as an A.C. squirrel cage motor, and is to be distinguished from a variable speed A.C. motor having multiple windings or multi-poles for speed control.

At each end of the shaft 24 of the motor 21 an eccentric weight 25 is mounted, and usually these weights are fixed to the shaft in parallel relationship, although in some instances, it may be desirable to vary their angular relative positions to achieve adjustment of the effective eccentric mass operating on the vibratory system, or adjusting weights may be added to or subtracted from the eccentric weights, as required. Shrouds 26 cover the ends of the motor to protect personnel from the revolving eccentric masses.

The motor 21 is supported on the trough 10 in such a manner that the exciting oscillatory force supplied by the eccentrically weighted motors is applied to the trough along a fixed angle of attack which is identified by the center line 27. This angle of attack is ordinarily on the order of from 20 to 40 degrees, and it will be seen that as an oscillating force is applied to the pan along this axis, the particulate on the trough is caused to move toward the open end of the trough 15 by what might be termed a "hopping" action. Obviously, as the frequency of the oscillating force is reduced and/or as the stroke is reduced, the rate of feed is correspondingly reduced and it is desirable to have this rate of feed variable between zero, or substantially zero, and the maximum rate of feed.

The springs 22 are preferably selected with K factors, that is, spring rates which are appropriately related to the frequency of the motor drive, the mass of the motor drive component, and the total mass of the driven vibratory system, so that under normal synchronous speed of the drive motor, the springs 22 will be at or near natural frequency with the system. In other words, for ideal operation, the vibratory system with its exciter drive is designed to operate at, as close to, the natural frequency of the system in a manner well known to the art. This is illustrated by the stroke-frequency curve of FIGURE 7, and natural frequency is at the peak of the curve.

It will be understood that the springs 22 are also designed so that lateral forces transverse to the longitudinal axis of the feeder trough are absorbed by the lateral deflections of the springs 22. Of course, if desired dual motors having the same characteristics as the motor 21, except for being each one-half the horsepower of the single motor, may be used in place of the single motor 21, in which case they are driven in opposite directions and have their motor housings rigidly joined together in a manner well known in the art so as to cause the rotating weights to phase together and cancel out the lateral forces while producing a resultant linear stroke.

It has been customary in vibrating feeders of the general type which has been described above to vary feed rate by altering in some manner the spring rate of the springs 22, or more precisely, to use a type of spring between the motor and the trough 10 which is capable of having its spring rate varied in some appropriate manner. Typical of this approach is the Musschoot Patent No. 2,984,339. This has been true even though A.C. squirrel cage motors have been used in such arrangements for providing the exciting force.

In my invention, I have found a most surprising and unique relationship between the characteristics of the vibratory system and the driving motor, whereby it is possible, in a manner which would never have been suspected, to vary not only the frequency, but also to simultaneously vary the stroke of a natural frequency vibrating feeder or similar vibratory system merely by changing the voltage on the A.C. motor. An A.C. squirrel cage motor has always been thought of as essentially a constant speed motor (except, of course, a multi-speed or multi-winding A.C. motor)—one which could not have its speed effectively varied by voltage control. I have found, however, that the variable load requirements of a free mass, natural frequency, vibratory system in relation to speed are similar to those of a fan or a fluid pump and that it is possible to use variations in the voltage applied to the A.C. squirrel cage motor as an effective means for controlling the feeding rate of this type of vibratory system, and that, surprisingly, this can be accomplished without motor overload.

This ability to control feeder rate merely by voltage control, of course, lends itself to the remote control of systems of this type, and is far more convenient than attempting to adjust or vary the rate of the force-transmitting spring units interposed between the motor and the feeder.

In the form of the invention shown in FIGURE 3, the feeder is of slightly different form. In this case, the feeder trough 40 is supported from a base 41 by helical springs 42 and leaf springs 43 with the motor drive preferably being mounted through leaf springs 19 on a bracket 44 carried beneath the pan 40 (to absorb lateral forces) and comprising an A.C. squirrel cage motor 45 of appropriate horsepower. In this case, a single motor may be used because the leaf springs 43 restrain the trough 40 from lateral vibratory movement, and the springs 19, if used, absorb most of the lateral forces, but again oppositely driven motors are preferred which completely avoids the need for springs 19. The entire free mass system preferably has a natural frequency corresponding to the frequency of the motor drive so that as the motor speed is reduced by reducing the voltage applied to the motor 45, the springs 42, which in this instance act in parallel as distinguished from being in series with the drive as in FIGURES 1 and 2, serve also to reduce the stroke of the drive because of the mechanical impedance which is presented to the motor by the action of the springs 42 and the inertia of the vibratory mass. Thus the stroke and frequency are, in this embodiment also, varied simultaneously.

The curves of FIGURES 4 through 7 are helpful in understanding the fundamental principles which are believed to underlie the present invention.

It is an accepted fact in the natural frequency vibrating system field (as for example in the type of feeder shown in Klemencik Patent No. 2,725,984) that one can normally determine whether the system is operating in natural frequency by checking the current draw on the motor, because, when the system is operating at true natural frequency, the current draw is at a minimum. Conversely, to the extent that a system of this type is not operating at natural frequency, the power requirements go up, and this is reflected in increased current draw, regardless of whether one is operating above or below the point of natural frequency.

The amazing thing about my invention is that when the system is operating in natural frequency, the current drawn by the motor is at its maximum, and, as the frequency (i.e. speed) of the motor is changed by dropping the voltage, the current decreases.

In other words, as one moves below natural frequency with the system disclosed in FIGURES 1, 2 and 3, the current going through the motor drops rather than rises, as might normally be expected.

One may postulate as to the explanation for this unique phenomenon, but obviously the significant fact is that I have found it possible with the system that I have disclosed to effectively vary the feed rate of a vibratory conveying or feeding system from substantially zero to its maximum feed rate, merely by adjusting the voltage of an A.C. squirrel cage motor. This of course can conveniently be done with an autotransformer, such as shown at 50 in FIGURE 2.

The explanation which appears most logical is revealed by a consideration of the graphs in FIGURES 4 through 7 inclusive, taken in conjunction with the vector diagrams of FIGURES 8a, 8b and 8c.

It is a fundamental of electric motor application technique to attempt to match motor torque operating characteristics with load torque characteristics. It is also axiomatic in the electric motor art that an A.C. squirrel cage motor is not to be used for adjustable speed drive, because the load torque requirements are such that when an attempt is made to substantially alter speed through change in voltage, the motor is overloaded and will burn out, except in the case when the motor drives a fan or a pump which is used in moving a fluid, wherein the load torque requirements are consistent with the thermal capability of a squirrel cage motor.

The reason why it is possible to use an A.C. squirrel cage motor and adjust the voltage thereon to vary the feed rate of the vibratory system is because the vibratory system is of the free mass, natural frequency type, that is, the motor exciter drive is a part of a natural frequency vibratory system and the vibratory system is isolated from ground, as distinguished from a vibratory system which is driven positively from a fixed stroke rotary eccentric member. This becomes apparent by referring to FIGURES 8a, 8b and 8c.

As will be seen by referring to FIGURE 8a, the force components of any natural frequency system are that the mass inertia vector may be represented by an upwardly directed vertical vector, the spring effect may be represented by a downwardly directed vertical vector exactly 180° out of phase, the system damping losses may be represented by a horizontal vector (drawn to the left in FIGURE 8a), and, obviously, the driving force, or the applied force, must equal the damping losses. Again, these two latter vectors are 180° out of phase.

As the system operates below natural frequency, we have a condition which is represented by FIGURE 8b, and it will be seen in this figure that the mass inertia vector has been diminished, the spring effect has been diminished, the damping losses have been diminished, and the applied force is subdivided into a horizontal and vertical component, with the horizontal component matching the damping losses, and the vertical component acting in opposition to the spring effect. This in itself creates a mechanical impedance which the motor sees, and it is for this reason that the stroke of the feeder is diminished, and also this explains why the current drawn by the motor, which is proportional to the damping losses, diminishes as one moves below natural frequency.

FIGURE 8c merely shows an exaggerated condition for falling to a greater extent below natural frequency, and, as apparent from this figure, the applied force is being rotated vectorially in a counterclockwise direction to a point where it approaches a vertical position, in which case it completely opposes the spring effect and thereby results in theoretical zero feed.

With this background, it can be seen how the motor characteristics revealed in one way or another in FIGURES 4 through 7 inclusive match the load torque characteristics of the free mass vibratory system.

In FIGURE 4, there is shown in general schematic form the various speed torque curves obtained when the applied voltage is varied to an A.C. squirrel cage motor. $S_1$ and $S_2$ demonstrate the speed values under these conditions when the torque load is held constant.

In FIGURE 5, there is shown in schematic form a curve which shows how a motor slips according to the torque demands with the applied voltage being held constant.

At $T_1$ demand, $S_1$ speed is obtained, and at $T_2$ demand, $S_2$ speed is obtained.

Therefore, what I have found is that an A.C. squirrel cage motor may be used effectively to change speed in response to a drop in applied voltage provided it sees a load torque demand that matches the thermal capacity of the motor and a natural frequency, free mass vibratory system is a unique system which satisfies this requirement.

Referring to FIGURE 6, which is representative of the watts, volts, amperes, and stroke characteristics plotted against speed for the form of vibratory feed shown in FIGURES 1, 2 and 3, it will be observed that all of these factors vary exponentially in relation to speed, and that a small change in speed causes a marked change in feed rate, current and watts, which explains why the feed rate can be changed in this manner without burning up the motor.

This figure also tends to show that the load torque characteristics of the motor are being matched with the load torque demands of the vibratory mass system.

FIGURE 7 is a curve which relates frequency to stroke in a natural frequency system, and it is the objective of this invention to operate as near the peak of the curve as is possible for maximum feed and normal load conditions. As a practical matter, the spring rates are chosen for no load condition so as to have the system operate at the point 5 indicated on the graph, so that when the feeder or conveyor is carrying a normal load, it will be operating near the point 1. As voltage is reduced on the motor to move from maximum feed rate to a lesser feed rate, the frequency and stroke are both being reduced, as shown by points 2, 3 and 4, until a zero feed rate is approached.

Although it is contemplated that a fixed rate spring would be used for tuning the vibratory mass to the frequency of the oscillatory drive, it is, of course, apparent that a variable rate spring might in some instances be used to approximate the natural frequency of the system and then adjust the rate of such spring until the frequency of the vibratory mass system is at, or near, the peak of the curve in FIGURE 7. After that, the control of frequency and stroke would be accomplished in the manner previously described by dropping the voltage on the A.C. squirrel cage motor.

It will be noted from FIGURE 6 that a speed change of less than 25% changes the rate of feed from maximum to near zero.

Although an autotransformer has been indicated as a way to adjust the voltage on the A.C. motor, it is obvious that there are other ways in which the voltage may be regulated as, for example, by the use of solid state type control including a gating transistor.

I claim:

1. In a variable drive vibrating device, the combination of a vibrating pan, means for mounting said mass so that it may vibrate as a free mass, means for vibrating the mass in a given path with a prescribed frequency and longitudinal stroke, said vibrating means including an A.C. squirrel cage motor, and means for varying the voltage applied to the motor for selectively altering the frequency and stroke at which the pan is vibrating.

2. The combination as set forth in claim 1 in which the voltage varying means comprises an autotransformer.

3. In a vibrating feeder, the combination of a pan mounted to vibrate as a free mass, an A.C. squirrel cage motor mounted on the pan and having an eccentric weight mounted on the motor shaft for furnishing an oscillating force to the pan, and spring means interposed between the motor and the pan whereby the oscillating force is applied to the pan along a fixed angle of attack, said spring means having a fixed rate of vibration substantially synchronized with the near synchronous speed of the motor when operating under normal voltage conditions, and means for reducing the voltage applied to the motor to thereby vary the frequency and stroke of the force applied to the pan.

4. In a vibratory feeder, the combination of a pan mounted for vibratory movement as a free mass, motor means for oscillating said pan at a given frequency and stroke, spring means operationally supporting the pan and having spring rates which are substantially tuned to the frequency of said oscillating force, whereby the vibrating pan is oscillated at or near natural frequency, and means for adjusting the frequency and stroke of said oscillating force, said last named means including an A.C. squirrel cage motor with means associated therewith for varying the voltage applied to said motor.

5. In an electric motor drive for a vibratory free mass system, the combination of a mass mounted for vibratory movement, means for exciting the mass to a vibratory movement with a given frequency and stroke, said means including an A.C. squirrel cage motor carrying an eccentric weight, and means for simultaneously varying both said stroke and said frequency, said last named means including means for varying the voltage applied to said motor.

6. In an electric motor drive for a vibratory free mass system as set forth in claim 5, in which the means for exciting the mass is connected in series with a spring having a rate such that the spring presents a variable mechanical impedance as the voltage to the motor is changed to control the frequency and stroke of the vibratory mass system.

7. In an electric motor drive for a vibratory free mass system as set forth in claim 5, in which the means for exciting the mass is connected in parallel with a spring having a rate such that the spring presents a variable mechanical impedance as the voltage to the motor is changed to control the frequency and stroke of the vibratory mass system.

8. In an electric motor drive for a free mass vibratory system of the type in which a mass is supported from the ground for free vibratory movement in a given path and has associated therewith an A.C. squirrel cage motor provided with one or more eccentric weights to impart to the mass a vibratory movement of given stroke and frequency, and in which spring means are interposed between the motor and the ground for allowing the mass to vibrate under the influence of the electric motor with its eccentric weight, the improvement in which the voltage of the electric motor is varied to simultaneously change both the stroke and frequency of the vibrating movement of the mass, and the spring means has a rate which offers an increased mechanical impedance to the electric motor drive as the voltage on the motor is reduced to effect simultaneous changes in the stroke and frequency of the vibrating mass.

9. The method of adjustably oscillating a vibratory mass system which consists in mounting the mass system for free vibratory movement, driving the mass in a vibratory manner at a given frequency and stroke by an A.C. squirrel cage motor mounted on said mass system and carrying an eccentric weight, varying the voltage applied to the motor to control the characteristics of the vibratory movement, and interposing between the motor drive and the mass, a fixed rate spring whereby varying the voltage of the motor varies not only the frequency of the drive but also the stroke.

10. The method as set forth in claim 9, in which the frequency of the fixed rate spring is at or near the drive frequency of the electric motor when the motor is operating at full rated voltage and reducing the voltage on the motor to simultaneously reduce said stroke and vibrating frequency.

11. The method of adjustably oscillating a vibratory mass system which consists in mounting the mass system for free vibratory movement, driving the mass in a vibratory manner at a given frequency and stroke by an A.C. squirrel cage motor mounted on said mass system and carrying an eccentric weight, varying the voltage applied to the motor to control the characteristics of the vibratory movement, and interposing, in parallel with the motor and the mass, a fixed rate spring whereby varying the voltage of the motor varies not only the frequency of the drive but also the stroke.

12. The method as set forth in claim 11, in which the frequency of the fixed rate spring is at or near the drive frequency of the electric motor when the motor is operating at full rated voltage and reducing the voltage on the motor to simultaneously reduce said stroke and vibrating frequency.

References Cited by the Examiner

UNITED STATES PATENTS

| | | | |
|---|---|---|---|
| 2,958,228 | 11/1960 | Carrier | 198—220 X |
| 2,989,869 | 6/1961 | Hanggi | 74—61 |
| 3,089,582 | 5/1963 | Musschoot | 198—220 |

FOREIGN PATENTS 698,604  10/1953  Great Britain.

EVON C. BLUNK, *Primary Examiner.*

EDWARD A. SROKA, *Examiner.*